(12) United States Patent
Kitamura et al.

(10) Patent No.: US 10,068,148 B2
(45) Date of Patent: Sep. 4, 2018

(54) IMAGE PROCESSING APPARATUS, AND OPERATION METHOD AND PROGRAM THEREFOR

(71) Applicant: FUJIFILM Corporation, Tokyo (JP)

(72) Inventors: Yoshiro Kitamura, Tokyo (JP); Tsutomu Inoue, Tokyo (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 0 days.

(21) Appl. No.: 14/642,045

(22) Filed: Mar. 9, 2015

(65) Prior Publication Data

US 2015/0262026 A1  Sep. 17, 2015

(30) Foreign Application Priority Data

Mar. 12, 2014 (JP) .................................. 2014-048599
Feb. 13, 2015 (JP) .................................. 2015-026070

(51) Int. Cl.
  *G06K 9/46* (2006.01)
  *G06K 9/52* (2006.01)
  (Continued)

(52) U.S. Cl.
  CPC ............. *G06K 9/46* (2013.01); *G06K 9/52* (2013.01); *G06K 9/6267* (2013.01);
  (Continued)

(58) Field of Classification Search
  CPC .......... G06K 9/46; G06K 9/52; G06K 9/6267; G06K 2009/4666; G06T 7/0012;
  (Continued)

(56) References Cited

U.S. PATENT DOCUMENTS

2004/0184646 A1* 9/2004 Oosawa ............. G06K 9/00127
  382/128
2006/0285747 A1* 12/2006 Blake ................. G06K 9/00234
  382/180
(Continued)

FOREIGN PATENT DOCUMENTS

EP  1 865 464 A2  12/2007
JP  2010-244321 A  10/2010
JP  2010-287091 A  12/2010

OTHER PUBLICATIONS

M. Bray, P. Kohli, and P. H. S. Torr. Posecut: Simultaneous segmentation and 3d pose estimation of humans using dynamic graph-cuts. In ECCV (2), pp. 642-655, 2006.*

(Continued)

*Primary Examiner* — Utpal Shah
(74) *Attorney, Agent, or Firm* — Sughrue Mion, PLLC

(57) ABSTRACT

For assigning a binary label representing belonging to a target region or not to each pixel in an image: a predicted shape of the target region is set; a pixel group including N pixels is selected, where N is a natural number of 4 or more, which have a positional relationship representing the predicted shape; and an energy function is set, which includes an N-th order term in which a variable is a label of each pixel of the pixel group, so that a value of the N-th order term is at a minimum value when a combination of the labels assigned to the pixels of the pixel group is a pattern matching the predicted shape, and increases in stages along with an increase in a number of pixels to which a label different from the pattern is assigned. The labeling is performed by minimizing the energy function.

10 Claims, 6 Drawing Sheets

(51) Int. Cl.
| | |
|---|---|
| *G06K 9/62* | (2006.01) |
| *G06T 7/00* | (2017.01) |
| *G06T 7/10* | (2017.01) |
| *G06T 7/12* | (2017.01) |
| *G06T 7/143* | (2017.01) |
| *G06T 7/149* | (2017.01) |

(52) U.S. Cl.
CPC .............. *G06T 7/0012* (2013.01); *G06T 7/10* (2017.01); *G06T 7/12* (2017.01); *G06T 7/143* (2017.01); *G06T 7/149* (2017.01); *G06K 2009/4666* (2013.01); *G06T 2207/30096* (2013.01)

(58) Field of Classification Search
CPC ....... G06T 7/10; G06T 7/0089; G06T 7/0083; G06T 7/0087; G06T 2207/30096
See application file for complete search history.

(56) References Cited

U.S. PATENT DOCUMENTS

| | | | |
|---|---|---|---|
| 2012/0327172 A1 | 12/2012 | El-Saban et al. | |
| 2013/0084007 A1 | 4/2013 | Salamati et al. | |
| 2014/0003704 A1* | 1/2014 | Liao | G06T 7/0075 382/154 |

OTHER PUBLICATIONS

Jianguo Wang, , Tieniu Tan National Laboratory of Pattern Recognition, Institute of Automation, Chinese Academy of Sciences, P.O. Box 2728, Beijing 100080, People's Republic of China Received Oct. 5, 1998, Revised Nov. 17, 1999, Accessed Dec. 30, 2016 at http://dx.doi.org/10.1016/S0167-8655(00)00008-8.*

Rother, Carsten and Kohli, Pushmeet and Feng, Wei and Jia, Jiaya, "Minimizing Sparse Higher Order Energy Functions of Discrete Variables", CVPR, Jan. 2009.*

Carsten Rother et al., "Optimizing Binary MRFs via Extended Roof Duality", CVPR, 2007, pp. 1-8.

Carsten Rother, et al., "Minimizing Sparse Higher Order Energy Functions of Discrete Variables", CVPR, 2009, pp. 1-8.

Pushmeet Kohli et al., "Robust Higher Order Potentials for Enforcing Label Consistency", International Journal of Computer Vision archive, 2009, pp. 302-324, vol. 82, No. 3.

Srikumar Ramalingam et al., "Exact Inference in Multi-label CRFs with Higher Order Cliques", Proc. CVPR, 2008, pp. 1-8.

Ladicky et al., "What, Where and How Many? Combining Object Detectors and CRFs," ECCV 2010, Sep. 5, 2010, XP019150754, Part IV, LNCS 6314, pp. 424-437.

Golland et al., "Detection and analysis of statistical differences in anatomical shape," Medical Image Analysis, Feb. 1, 2005, XP027847006, pp. 69-86.

Communication dated Jan. 26, 2016 from European Patent Office in counterpart Application No. 15158153.5.

Nakagomi et al., "Improvement of lung segmentation from a chest CT volume with multi-shape graph-cuts," IEICE Technical Report, The Institute of Electronics, Information and Communication Engineers, 2011, vol. 110, pp. 211-216.

Yuasa et al., "Automatic Heart Wall Contour Extraction Method on MR Images Using Active Contour Models—Initial Contour Setting Based on Principal Component Analysis," Dec. 1999, D-II, vol. J82-D-II, No. 12, pp. 2345-2354.

Communication dated Jan. 26, 2016 from Japanese Patent Office in counterpart Application No. 2015-026070.

Communication dated Jun. 22, 2018 issued by the European Patent Office in counterpart application No. 15158153.5.

* cited by examiner

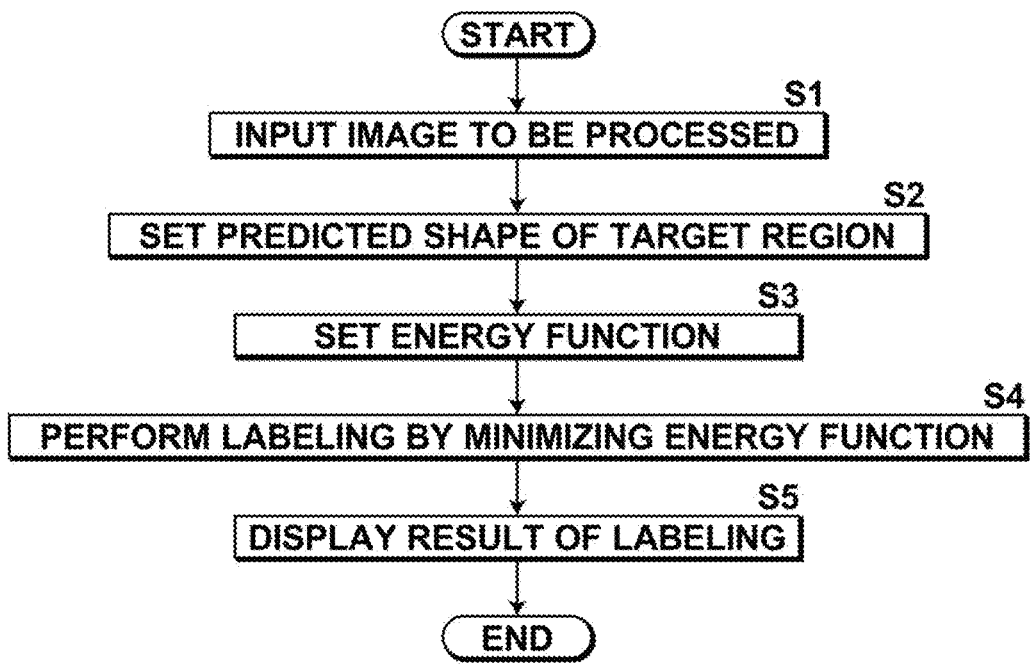

IMAGE PROCESSING APPARATUS, AND OPERATION METHOD AND PROGRAM THEREFOR

CROSS REFERENCE TO RELATED APPLICATIONS

The present application claims priority under 35 U.S.C. § 119(a) to Japanese Patent Application No. 2014-048599 filed on Mar. 12, 2014 and Japanese Patent Application No. 2015-026070 filed on Feb. 13, 2015. Each of the above applications is hereby expressly incorporated by reference, in its entirety, into the present application.

BACKGROUND OF THE INVENTION

Technical Field

The present invention relates to an image processing apparatus for extracting a predetermined target region from an image, and an operation method and a program therefor.

Background Art

Hitherto, a method of formulating segmentation of an image as an energy minimization problem, and solving the energy minimization problem by using a graph cut algorithm has been known. For example, segmentation of the image may be posed as a problem of assigning a value (label) of 0 or 1 representing belonging to a target region or belonging to another region to each variable $x_1, x_2, \ldots x_n$ corresponding to each pixel in the image, and a quadratic energy function E such as that represented by Expression (1), in which energy decreases as the assigning (i.e., the labeling) becomes more desirable, is defined to determine a solution that minimizes the quadratic energy function E.

[Math. 1]

$$E(x_i, \ldots, x_n) = \sum_i E^i(x_i) + \sum_{(i,j)} E^{ij}(x_i, x_j) \quad (1)$$

As a method of solving such a minimization problem, in C. Rother, et al., "Optimizing Binary MRFs via Extended Roof Duality", CVPR, pp. 1-8, 2007 (hereinafter Non-Patent Literature 1), there is proposed a method of globally determining a solution using a minimum cut algorithm when energy is submodular, and determining an optimal solution or an approximate solution using a quadratic pseudo-Boolean optimization (QPBO) algorithm when energy is non-submodular.

Further, in C. Rother, et al., "Minimizing Sparse Higher Order Energy Functions of Discrete Variables", CVPR, pp. 1-8, 2009 (hereinafter Non-Patent Literature 2), there is proposed a method of solving a minimization problem of a third order or higher energy function by converting the minimization problem into an equivalent minimization problem of a quadratic energy function. In P. Kohli et al., "Robust Higher Order Potentials for Enforcing Label Consistency", International Journal of Computer Vision archive, Vol. 82, No. 3, pp. 302-324, 2009 (hereinafter Non-Patent Literature 3), there is proposed a method in which segmentation of an image is provided with robustness by, when defining high order submodular energy, setting the values of higher-order terms to be at a minimum value when the same label is assigned to all of the variables, so that energy gradually increases along with an increase in the number of variables assigned to different labels.

SUMMARY OF INVENTION

However, in the field of image processing, when extracting a target region having a specific shape that is predictable to a certain extent, such as an organ region or a tumor region, from a medical image, for example, in order to improve the extraction performance, the effective use of high order energy based on the shape characteristics of the target region is desirable. However, none of Non Patent Literatures 1 to 3 discloses a method of utilizing high order energy suited to extraction of a target region having a predictable shape.

Therefore, it is an object of the present invention to provide an image processing apparatus, and an operation method and a program therefor, capable of extracting a target region having a predictable shape more accurately and more robustly.

An image processing apparatus according to one embodiment of the present invention is configured to assign a binary label representing belonging to a target region or belonging to another region to each pixel in an image, the image processing apparatus including: a shape setting unit configured to set a predicted shape of the target region; an energy function setting unit configured to: select a pixel group including N pixels in the image, where N is a natural number of 4 or more, which have a positional relationship representing the set predicted shape; and set an energy function including an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value along with an increase in a number of pixels to which a label different from the pattern is assigned; and a labeling unit configured to perform the labeling by minimizing the set energy function.

In the image processing apparatus according to one embodiment of the present invention, the energy function setting unit may set the energy function using the pattern including one or more of each of the binary labels.

Further, the energy function setting unit may set the energy function using the pattern including only labels representing belonging to the target region. In this case, the energy function setting unit may be configured to: further select, when all of the N pixels of the selected pixel group belong to the target region, a second pixel group including M pixels in the image, where M is a natural number of 4 or more, which are located at a position expected to belong to the another region; and set the energy function further including an M-th order term in which a variable is a label of each of the M pixels of the selected second pixel group, so that a value of the M-th order term is at a second minimum value when all of the labels assigned to the M pixels of the second pixel group are the label representing belonging to the another region, and increases in stages from the second minimum value along with an increase in the number of pixels assigned with the label representing belonging to the target region.

Further, in the image processing apparatus according to one embodiment of the present invention, the energy function setting unit may set the energy function so that an increment of the value of the N-th order term increases based on assignment of, among the N pixels of the selected pixel group, a label different from the pattern to pixels farther away from an outline of the predicted target region assumed when the combination of the labels assigned to the N pixels of the pixel group is the pattern.

Further, in the image processing apparatus according to one embodiment of the present invention, the shape setting unit may set a plurality of different shapes as the predicted shape of the target region, and the energy function setting unit may be configured to: select pixel groups respectively corresponding to the set plurality of different shapes, the pixel groups each including N pixels that have a positional relationship representing each of the set plurality of different shapes; determine N-th order terms corresponding to each of the selected pixel groups in which a variable is a label of each pixel of the each of the selected pixel groups; and set the energy function including a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value along with an increase in the number of pixels to which a label different from the pattern is assigned.

Further, in the image processing apparatus according to one embodiment of the present invention, when the target region is a tumor region, the shape setting unit may set a plurality of ellipses each having a different degree of circularity as the predicted shape of the target region. Further, when the target region is a muscle region, the shape setting unit may set a plurality of relaxation curves each having a different degree of change in curvature as the predicted shape of the target region. Further, when the target region is a vascular region, the shape setting unit may set a plurality of circles or spheres each having a different size and a different position, or each having any one of a different size or a different position as the predicted shape of the target region. Further, when the target region is an organ region, the shape setting unit may set a plurality of organ shapes each having a different principal component parameter obtained by principal component analysis as the predicted shape of the target region.

An image processing method according to one embodiment of the present invention is executed by an image processing apparatus, which includes a shape setting unit, an energy function setting unit, and a labeling unit, for assigning a binary label representing belonging to a target region or belonging to another region to each pixel in an image. The image processing method includes: setting, by the shape setting unit, a predicted shape of the target region; selecting, by the energy function setting unit, a pixel group including N pixels in the image, where N is a natural number of 4 or more, which have a positional relationship representing the set predicted shape, to set an energy function including an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value along with an increase in a number of pixels to which a label different from the pattern is assigned; and performing, by the labeling unit, the labeling by minimizing the set energy function.

An image processing program according to one embodiment of the present invention assigns a binary label representing belonging to a target region or belonging to another region to each pixel in an image, the image processing program causing a computer to function as: a shape setting unit configured to set a predicted shape of the target region; an energy function setting unit configured to: select a pixel group including N pixels in the image, where N is a natural number of 4 or more, which have a positional relationship representing the set predicted shape of the target region; and set an energy function including an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value along with an increase in a number of pixels to which a label different from the pattern is assigned; and a labeling unit configured to perform the labeling by minimizing the set energy function.

Further, the above-mentioned image processing program, usually, includes a plurality of program modules, and the above-mentioned functions of the respective units are each realized by one or a plurality of program modules. This group of program modules is recorded on a recording medium, such as a CD-ROM and a DVD. Alternatively, this group of program modules is provided to the user by being recorded in a downloadable state in storage accompanying a server computer or in network storage.

The image processing apparatus, and the operation method and the program therefor, according to one embodiment of the present invention are configured to, when assigning a binary label representing belonging to a target region or belonging to another region to each pixel in an image, set the predicted shape of the target region, and select a pixel group including N pixels in the image, where N is a natural number of 4 or more, which have a positional relationship representing the set predicted shape of the target region, to set an energy function including an N-th order term in which a variable is a label of each pixel of the selected pixel group, so that a value of the N-th order term is at a minimum value when a combination of the labels assigned to the pixels of the selected pixel group is a pattern matching the set predicted shape of the target region, and increases in stages from the minimum value along with an increase in the number of pixels to which a label different from the pattern is assigned. Therefore, a labeling result that is more suited to the shape of the target region can be obtained, and cases in which the actual shape of the target region differs from the predicted shape to some extent can be handled flexibly. Consequently, a target region having a predictable shape can be extracted more accurately and more robustly.

BRIEF DESCRIPTION OF THE DRAWINGS

FIG. 15 is a flowchart illustrating a flow of processing carried out by the image processing apparatus.

DESCRIPTION OF EMBODIMENT

Figure 1:
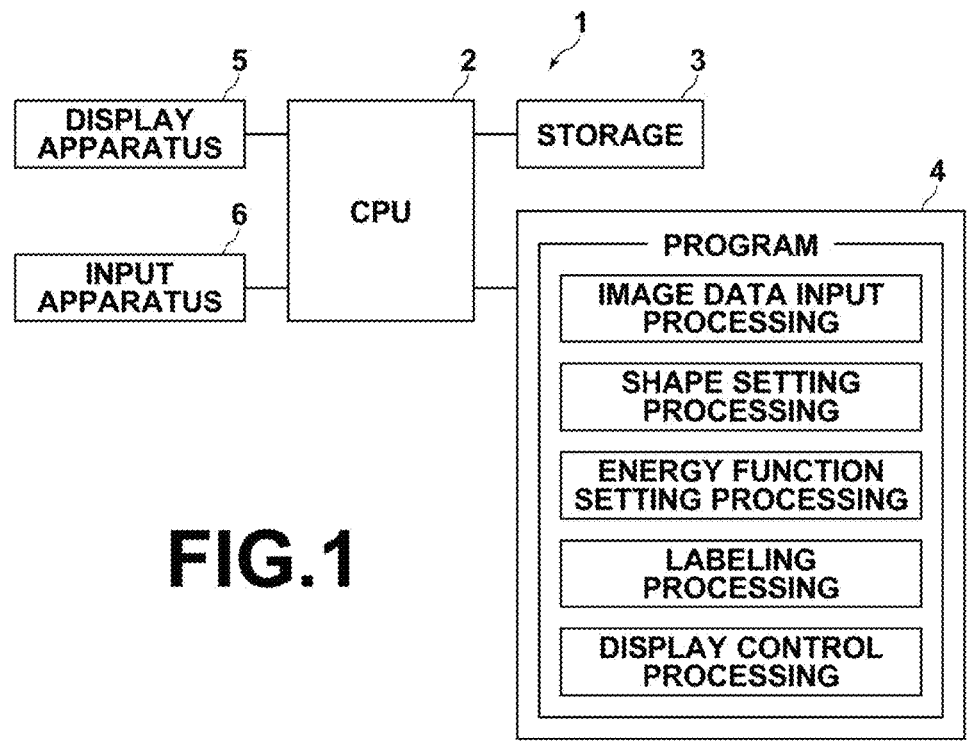
FIG. 1 illustrates a schematic configuration of an image processing apparatus.

An embodiment of the present invention is described below with reference to the drawings. An image processing apparatus 1 according to the present invention is realized by an image processing program being loaded to a computer and executed. As illustrated in FIG. 1, the image processing apparatus 1 includes a central processing unit (CPU) 2, a memory, and a storage 3, such as a hard disk drive (HDD). Further, a display apparatus 5, such as a display, and an input apparatus 6, such as a mouse and a keyboard, are connected to the image processing apparatus 1.

Figure 2:
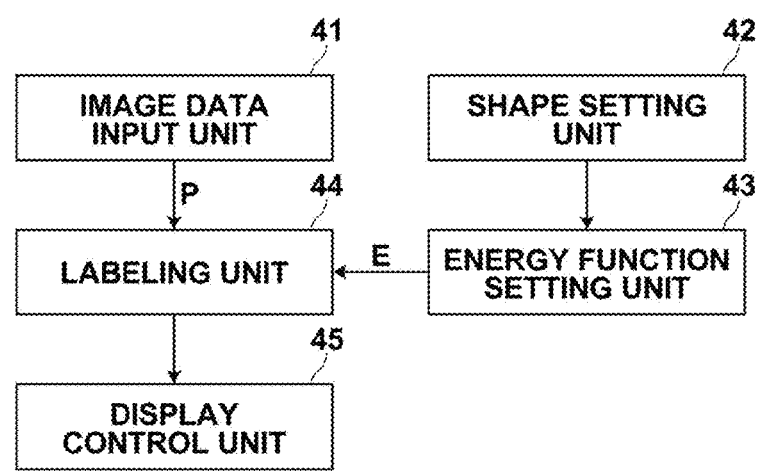
FIG. 2 is a block diagram illustrating functions implemented in the image processing apparatus.

An image processing program and data referenced by the program are stored in the storage 3, and are loaded into the memory when the image processing program is started. The image processing program defines, as the processing to be executed in the CPU, image data input processing, shape setting processing, energy function setting processing, labeling processing, and display control processing. Then, by the CPU executing each processing described above in accordance with the definitions of the program, as illustrated in FIG. 2, the computer functions as an image data input unit 41, a shape setting unit 42, an energy function setting unit 43, a labeling unit 44, and a display control unit 45. In this case, FIG. 2 schematically illustrates the functions implemented in the image processing apparatus 1 as blocks.

The image data input unit 41 is configured to receive an input of an image P (two-dimensional or three-dimensional image data) of an image processing target including a target region to be extracted, and store the received image P in the storage 3. At this point, the target region is, for example, a region having a specific shape that is predictable to a certain extent, such as an organ region and a tumor region.

The shape setting unit 42 is configured to set a predicted shape of the target region. The predicted shape of the target region can be set manually or automatically. When setting automatically, for example, the shapes predicted for each type of region that may be a target of the extraction processing can be registered in advance, and a predicted shape of the target region to be extracted can be acquired and set from among the registered predicted shapes. When setting manually, an input can be received from a user who specifies the shape to be predicted of the target region, and the specified shape can be set as the predicted shape.

Figure 3:
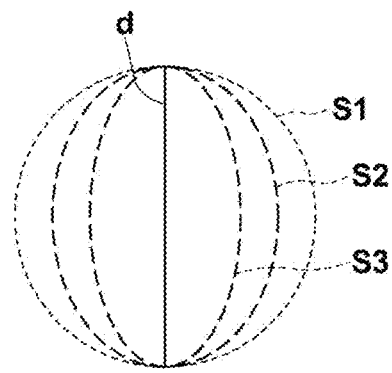
FIG. 3 illustrates a method of setting a predicted shape of a tumor region.

The shape setting unit 42 may be configured to set one shape or to set a plurality of different shapes as the predicted shape of the target region. For example, when the target region is an elliptical (including an exact circle) tumor region having a specifiable long diameter, as the predicted shapes of the target region, the shape setting unit 42 may set a plurality of ellipses Sk (k=1, 2, . . . ) having different degrees of circularity that have a common long diameter d as illustrated in FIG. 3.

Figure 4:
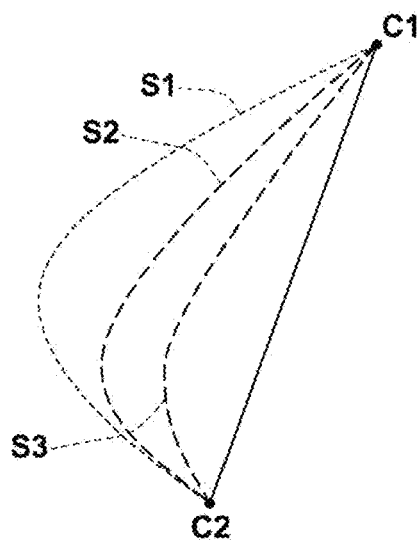
FIG. 4 illustrates a method of setting a predicted shape of a muscle region.

Further, when the target region is a muscle region in which both end points of the muscle are specifiable, such as when extracting the psoas major muscle from a CT image, a plurality of relaxation curves Sk (k=1, 2, . . . ) each sharing both end points C1 and C2 and each having a different degree of change in curvature, such as those illustrated in FIG. 4, may be set as the predicted shapes of the target region. In this case, the relaxation curves are represented by a polynomial equation. The plurality of relaxation curves having a different degree of change in curvature may be generated by changing the parameters of this polynomial equation.

Figure 5:
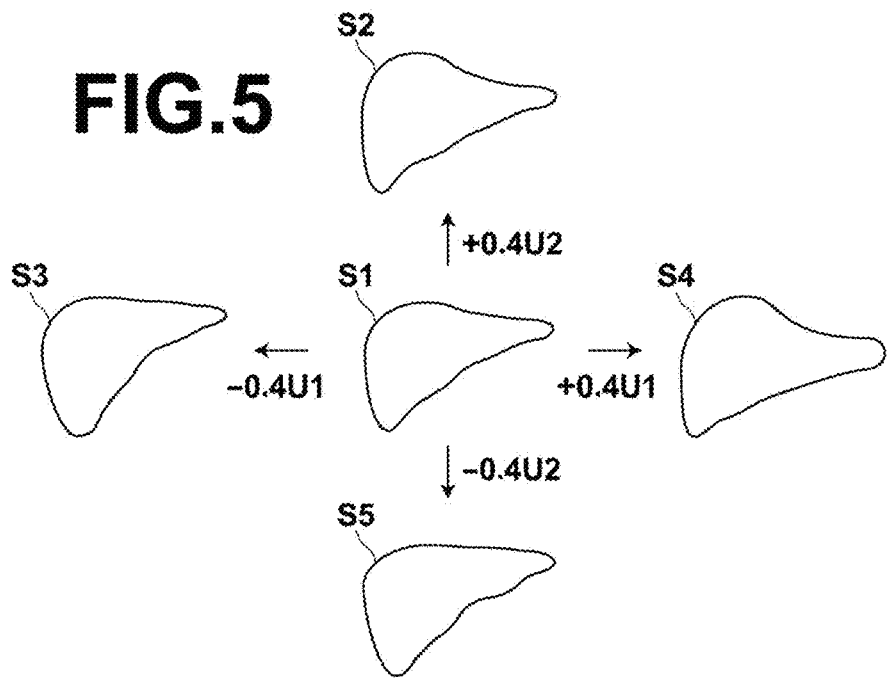
FIG. 5 illustrates a method of setting a predicted shape of an organ region.

In addition, when the target region is a vascular region, a plurality of circles or spheres having different sizes or positions may be set as the predicted shapes of the target region. Still further, when the target region is an organ region, like an active shape model (ASM), for example, a plurality of organ shapes Sk (k=1, 2, . . . ) obtained by determining an average shape S1 and a vector for changing the average shape by performing principal component analysis, independent component analysis, and the like on the shape of the organ region, and, as illustrated in FIG. 5, changing a parameter of each of those vectors, may be set as the predicted shapes of the target region. Note that, in FIG. 5, U1 represents a first principal component, and U2 represents a second principal component.

Further, the shape setting unit 42 may have, in addition to or in place of the function of setting the predicted shapes of the target region by the above-mentioned method, a function of analyzing the image P of the image processing target, the input thereof being received by the image data input unit 41, to set the predicted shapes of the target region based on a result of the analysis. For example, a plurality of shapes, which are obtained by temporarily extracting an outline of the target region from the image P of the image processing target by an arbitrary method, by determining at least one principal component parameter of the temporarily extracted outline by principal component analysis, and by changing the determined principal component parameter, may be set as the predicted shapes of the target region. For example, when the image P of the image processing target is an axial cross-sectional image of the abdomen and the target region is an abdominal cavity, an outline of the abdominal cavity is roughly extracted based on information on regions of bones and lung fields (air) in the image P, and at least one principal component parameter or the like of the extracted outline is determined by principal component analysis. Then, the determined principal component parameter is changed to obtain a plurality of shapes, and the plurality of shapes are set as the predicted shapes of the target region.

The energy function setting unit 43 is configured to set an energy function E giving an energy value in each case of assigning a value (label) of 0 or 1 representing belonging to a target region or belonging to another region to each variable $x_1, x_2, \ldots x_n$ corresponding to each pixel in the image. The energy function E is set so that the energy value decreases as the division of the region represented by the assigning (i.e., labeling) becomes more desirable. For example, an energy function E such as that represented by Expression (2) is set.

[Math. 2]

$$E(x_i, \ldots, x_n) = \sum_i E^i(x_i) + \sum_{(i,j)} E^{ij}(x_i, x_j) + \sum_c E^c(X_c) \quad (2)$$

In Expression (2), a first-term energy $\Sigma E^i(x_i)$ is a linear term in which the label assigned to each pixel is the variable, and a second-term energy $\Sigma E^{ij}(x_i,x_j)$ is a quadratic term in which the labels of a pair of adjacent two pixels are the variable.

Further, a third-term energy $\Sigma E^c(X_c)$ is an N-th order term in which the variable is the labels of a pixel group including N pixels, N being a natural number of 4 or more, which are selected as having a positional relationship representing the predicted shape of the target region. The value of the N-th order term is set so as to be at a minimum value when the combination of the labels assigned to pixels of the pixel group is a pattern matching the predicted shape of the target region, and so as to increase in stages from the minimum value along with an increase in the number of pixels to which a label different from the pattern is assigned. Note that, a case is now described in which there is one predicted shape set by the shape setting unit 42. A case in which there are a plurality of different shapes is described later.

Here, the meaning of N pixels having a positional relationship representing the predicted shape of the target region is a pixel group from which the general shape of the overall target region is extractable based on the arrangement and the combination of labels of the pixel group, and may be, for example, a pixel group, the pixels of which are distributed along an outline of the predicted shape (the shape to be extracted such as the above-mentioned circle, ellipse, and relaxation curve etc.).

Figure 6:
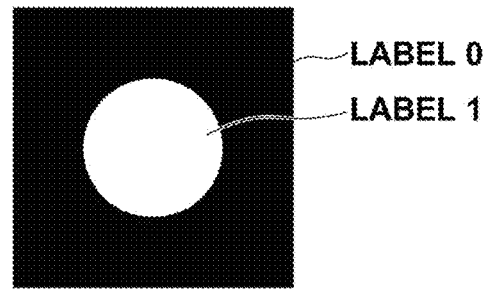
FIG. 6 illustrates a non-submodular method.

Further, the selection of the N pixels having a positional relationship representing the predicted shape of the target region is different depending on which of two methods, submodular or non-submodular, is used for setting the energy in the above-mentioned third term $\Sigma E^c(X_c)$. In a non-submodular method, the energy value is set so as to decrease when, as illustrated in FIG. 6, a label 1 representing the target region is assigned to the pixels in the target region indicated by the circular region in FIG. 6, and a label 0 representing belonging to another region that is not the target region is assigned to the pixels in the another region. Therefore, as the N pixels, one or more pixels are selected from inside and from outside the predicted shape.

Figure 7:
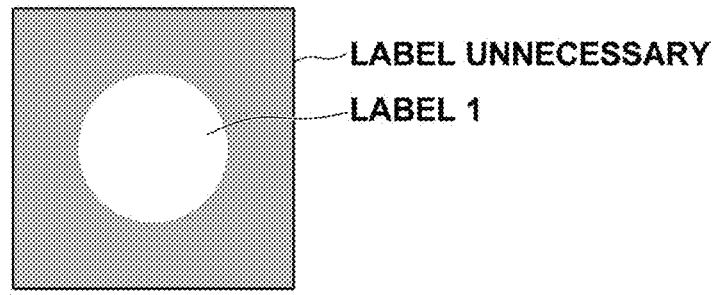
FIG. 7 illustrates a submodular method.
Figure 8:
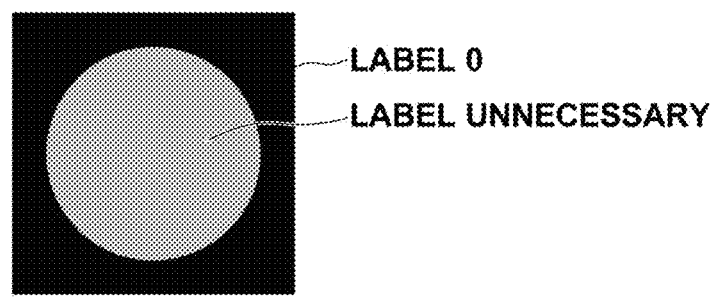
FIG. 8 illustrates another submodular method.

In a submodular method, the energy value is set so as to decrease when, as illustrated in FIG. 7, the label 1 representing the target region is assigned to the pixels in the target region. Therefore, all of the N pixels are selected from inside the predicted shape. The submodular method may also be carried out by adding the energies having an energy value that decreases when, as illustrated in FIG. 8, the label 0 representing belonging to another region is assigned to the pixels in the another region.

This added energy is an M-th order term in which the variable is the labels of a second pixel group including M pixels, M being a natural number of 4 or more, which are positioned outside the predicted shape. The value of the M-th order term can be set to be at a second minimum value when all of the labels assigned to pixels of the second pixel group are the label 0 representing belonging to another region, and increase in stages from the second minimum value along with an increase in the number of pixels assigned with the label 1 representing belonging to the target region.

Expression (3) shows an example of an energy function capable of being employed as the above-mentioned third-term energy $\Sigma E^c(X_c)$ in the case of the submodular method. In Expression (3), $\alpha_i$ (i=1, 2, ... n) is a weighting coefficient assigned to each variable $x_i \in \{1,0\}$, $\gamma$ is a truncation coefficient, and $z \in \{1,0\}$ is an auxiliary variable. In Expression (3), the energy $\Sigma E^c(X_c)$ is at a minimum value when a value (label) of 1 is assigned to all of the variables $x_i$. Within the range of $\Sigma \alpha_i x_i$ being $\gamma$ or less, the energy $\Sigma E^c(X_c)$ gradually increases with an increase in the number of variables assigned with a value (label) of 0, and within the range of $\Sigma \alpha_i x_i$ being more than $\gamma$, the energy $\Sigma E^c(X_e)$ has a fixed maximum value of 0.

[Math. 3]

$$\min_{X; z \in \{0,1\}} -z(\alpha_1 x_1 + \alpha_2 x_2 + \ldots + \alpha_n x_n - \gamma) = \quad (3)$$

$$\begin{cases} -\left(\sum_i \alpha_i x_i - \gamma\right) & \text{if } \sum_i \alpha_i x_i - \gamma \geq 0 \\ 0 & \text{otherwise} \end{cases}$$

Figure 9:
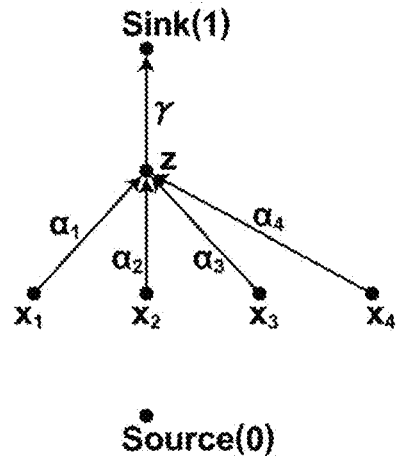
FIG. 9 is a graph showing an N-th order submodular energy.

Further, FIG. 9 expresses Expression (3) as a graph, in which the magnitude of the minimum among the required cuts for dividing the apexes of the graph into an apex group including a Sink point and an apex group including a Source point matches the minimum value of the energy values given by the energy function of Expression (3).

Figure 10:
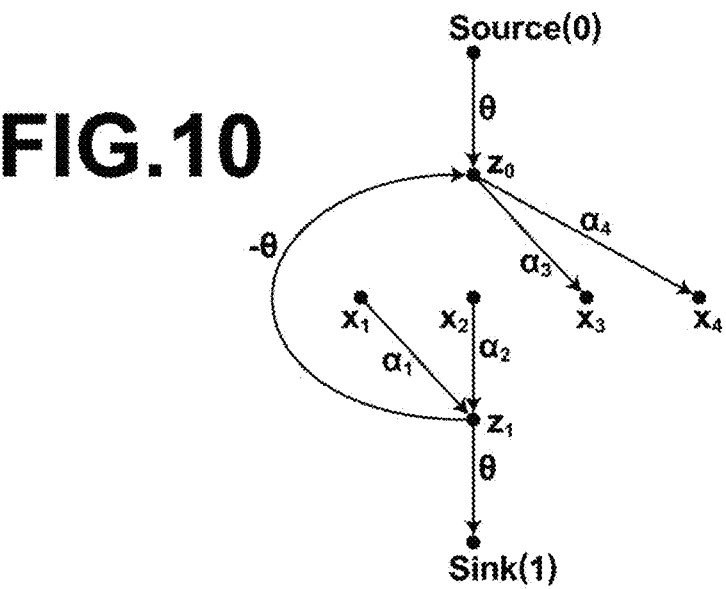
FIG. 10 is a graph showing an N-th order non-submodular energy.

In addition, Expression (4) shows an example of an energy function capable of being employed as the above-mentioned third-term energy $\Sigma E^c(X_c)$ in the case of the non-submodular method. In Expression (4), $\alpha_i$ (i=1, 2, ... n) is a weighting coefficient assigned to each variable $x_i \in \{1,0\}$ and $z_0, z_1 \in \{1,0\}$ are each an auxiliary variable. Further, $S_0(X_0)$ is a set of variables assigned with the label of 0 in labeling $X_0$, and $S_1(X_0)$ is a set of variables assigned with the label of 1 in labeling $X_0$. In addition, $\theta$ (>0) is a real number. Further, FIG. 10 expresses Expression (4) as a graph.

[Math. 4]

$$\min_{X; z_0, z_1 \in \{0,1\}} \theta z_0 + \theta(1 - z_1) - \theta z_0(1 - z_1) + \quad (4)$$

$$\sum_{i \in S_0(X)} \alpha_i(1 - z_0) + \sum_{i \in S_1(X)} \alpha_i z_1(1 - x_i) =$$

$$\begin{cases} \sum_{i \in S_0(X)} \alpha_i x_i + \sum_{i \in S_1(X)} \alpha_i(1 - x_i) & \text{if } \sum_{i \in S_0(X)} \alpha_i x_i + \sum_{i \in S_1(X)} \alpha_i(1 - x_i) \geq \theta \\ \theta & \text{otherwise} \end{cases}$$

Expression (4) determines the energy function of a polynomial equation (pseudo-Boolean equation) giving a minimum value 0 when the combination of the labels assigned to pixels of the above-mentioned pixel group including N pixels is a pattern matching the predicted shape of the target region, and giving a value $\theta$ (>0) in other cases, and converts (Type-I conversion: see Non Patent Literature 2) a minimization problem of the thus determined high order energy function into a minimization problem of a quadratic energy function such as that represented by Expression (5) using the auxiliary variables $z_0$ and $z_1$. In addition, Expression (4) adds a weighting coefficient $\alpha_i$ to be assigned to each variable $x_i$.

[Math. 5]

$$\min_{Xc; z_0, z_1 \in [0,1]} \theta z_0 + \theta(1 - z_1) - \theta z_0(1 - z_1) + \sum_{i \in S_0(X_0)} (1 - z_0)x_i + \sum_{i \in S_1(X_0)} z_1(1 - x_i) \quad (5)$$

Consequently, in Expression (4), the energy $\Sigma E^c(X_c)$ is at a minimum value when the combination of the labels assigned to pixels of the above-mentioned pixel group including N pixels is a pattern matching the predicted shape of the target region, and increases in stages from the minimum value along with an increase in the number of pixels assigned with a label different from the pattern.

Further, in the above-mentioned third-term energy $\Sigma E^c(X_c)$ defined by Expression (3) or Expression (4), the weighting coefficients $\alpha_i$ assigned to respective variables $x_i$ may be set to be all the same value. Alternatively, the weighting coefficient $\alpha_i$ may also be set to increase as a pixel represented by the variable is farther from an outline of the above-mentioned predicted shape. In particular, when the weighting coefficient $\alpha_i$ is set to a different value depending on the distance from the outline of the predicted shape, there is an increase in the increment of the energy value (the value of the N-th order term) caused by pixels that are a greater distance away from the outline of the predicted shape and hence are assigned with a different label from the pattern matching the predicted shape of the target region. Therefore, a labeling effect more suited to the shape of the target region may be obtained than when all the weighting coefficients $\alpha_i$ are set to the same value.

Figure 11:
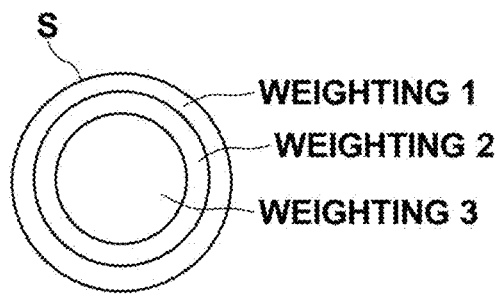
FIG. 11 illustrates an example in which a weighting coefficient is set in stages based on a distance from an outline of a predicted shape.
Figure 12:
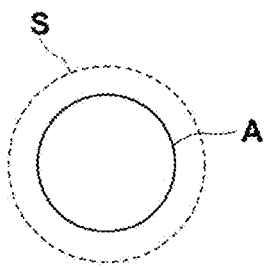
FIG. 12 illustrates an effect obtained by setting the weighting coefficient in stages.
Figure 13:
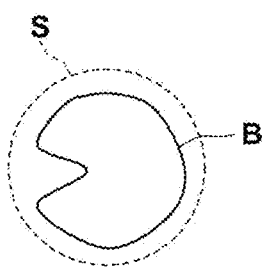
FIG. 13 illustrates an effect obtained by setting the weighting coefficient in stages.

For example, as illustrated in FIG. 11, it is assumed that a value of 1 is assigned as the weighting of each pixel on an inner side by one pixel from an outline S of the predicted shape of the target region, a value of 2 is assigned as the weighting of each pixel on the inner side by even one more pixel, and a value of 3 is assigned as the weighting of each pixel on the inner side by still even one more pixel, and two regions A and B such as those illustrated in FIGS. 12 and 13, in which the difference in area from the predicted shape is the same for both the regions, are assumed. In such a case, the difference in area corresponds to the region labeled differently from the pattern matching the predicted shape of the target region. Accordingly, in the portion forming the above-mentioned difference in area, the region B, which is a dissimilar shape to the predicted shape, contains more pixels that are farther away from the outline of the predicted shape than the region A, which is a similar shape to the predicted shape. Therefore, the case of the region A has a smaller energy than the case of the region B, and hence is determined as having more desirable labeling.

Figure 14:
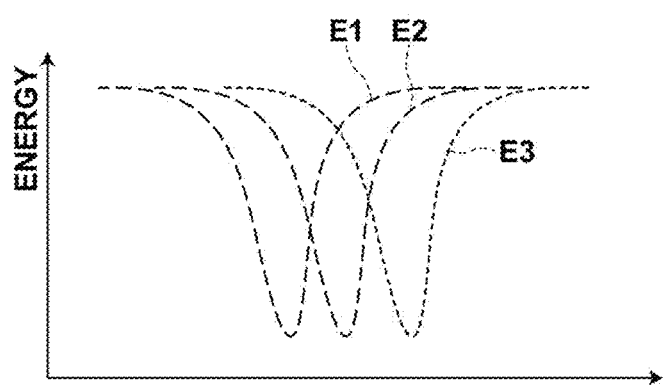
FIG. 14 shows how to set energy functions capable of corresponding to a plurality of shapes.

Further, when a plurality of different shapes are set as the predicted shape by the shape setting unit 42, the energy function setting unit 43 sets the energy function E by providing an N-th order energy such as the third term of Expression (2) corresponding to each shape, and adding all of those energies to Expression (2). In this case, for example, as shown in FIG. 14, the energy Em (m=1, 2, ... ) provided corresponding to each of the plurality of shapes is obtained as a sum. The condition for giving the minimum value at each energy, namely, the case where the result of labeling matches the shape corresponding to that energy, is the condition for giving a local minimum even for the whole energy function E. Consequently, an energy function E capable of corresponding to each of those plurality of shapes may be provided.

The labeling unit 44 labels the binary label representing belonging to a target region or belonging to another region to each pixel in an image P by minimizing the energy function E set by the energy function setting unit 43. The labeling unit 44, basically, globally determines a solution using a minimum cut algorithm when the energy function E is submodular, and determines an optimal solution or an approximate solution using a quadratic pseudo-Boolean optimization (QPBO) algorithm when the energy function E is non-submodular (see Non Patent Literature 1). When the energy function E is a third order or higher energy function, the optimal solution is determined by solving the minimization problem by converting the minimization problem into an equivalent minimization problem of a quadratic energy function based on Expression (3) or Expression (4).

The display control unit 45 is configured to display the image P in which the range of the target region is displayed by a border and the like on a display apparatus as a result of the labeling by the labeling unit 44.

Next, a flow of the processing performed by the image processing apparatus 1 is described with reference to the flowchart of FIG. 15. First, the image data input unit 41 receives an input of the image P of an image processing target including a target region to be extracted, and stores the received image P in the storage 3 (S1). Next, the shape setting unit 42 sets the predicted shape of the target region to be extracted (S2). Then, the energy function setting unit 43 sets the energy function E for giving an energy value in each case of assigning a binary label representing belonging to the target region or belonging to another region to each variable corresponding to each pixel in the image, the energy function E being set so that the energy value decreases when the division of the region represented by the assigning is more desirable (S3). At this point, the energy function E includes an N-th order term in which the variable is the label of each pixel of a pixel group including N pixels (N being a natural number of 4 or more) that have a positional relationship representing the predicted shape set in Step S2. The value of this N-th order term is set so as to be at a minimum value when the combination of the labels assigned to pixels of the pixel group is a pattern matching the predicted shape of the target region, and so as to increase in stages from the minimum value along with an increase in the number of pixels to which a label different from the pattern is assigned. Further, at this point, the energy function setting unit 43 may register in advance an energy function for each type of region capable of being a target of the extraction processing, and acquire and set the energy function corresponding to the target region to be extracted from among the registered energy functions.

Next, the labeling unit 44 assigns a binary label representing belonging to a target region or belonging to another region to each pixel in the image P by minimizing the energy function E set in Step S3 (S4). At this point, the labeling unit 44 may calculate, for example, the energy given in each case of assigning a label to each pixel in the image, and output the assignment of labels for which energy is at a minimum as a final result. Further, the display control unit 45 displays the image P in which a range assigned with a label representing belonging to the target region is displayed by a border and the like on the display apparatus 5 (S5), and then the processing finishes.

Based on the configuration described above, according to the image processing apparatus 1 of this embodiment, when assigning a binary label representing belonging to a target region to be extracted or belonging to another region to each pixel in the image P, the shape setting unit 42 sets the predicted shape of the target region, the energy function setting unit 43 selects a pixel group including N pixels in the image P, where N is a natural number of 4 or more, which have a positional relationship representing the set predicted shape, to set an energy function E including an N-th order term in which a variable is a label of each pixel of the selected pixel group, so that a value of the N-th order term is at a minimum value when a combination of the labels assigned to the pixels of the selected pixel group is a pattern matching the set predicted shape of the target region, and increases in stages from the minimum value along with an increase in the number of pixels to which a label different from the pattern is assigned, and the labeling unit 44 assigns the labels by minimizing the set energy function E. Therefore, a labeling result that is more suited to the shape of the target region can be obtained, and cases in which the actual shape of the target region differs from the predicted shape to some extent can be handled flexibly. Consequently, a target region having a predictable shape can be extracted more accurately and more robustly.

In addition, in the above-mentioned embodiment, when setting the energy function E so that the increment of the energy value (the value of the N-th order term), which is caused by pixels that are a greater distance away from the outline of the predicted shape and are assigned with a different label from the pattern matching the predicted shape of the target region, increases by determining the weighting coefficient $\alpha_i$ in the N-th order term of pixels represented by the corresponding variable to be larger for pixels farther away from the outline of the predicted shape, a labeling effect more suited to the shape of the target region may be obtained than when all the weighting coefficients $\alpha_i$ are set to the same value.

In addition, the method according to the present invention is not limited to binary labeling of a target region and a non-target region. The inventive method may also be applied to problems in multi-value labeling in which labeling is carried out using three or more multiple values. For example, when a label $x_i$ takes 1 different values of 1, 2, . . . , the inventive method may also be applied by, based on a predetermined method, performing binary encoding in which a label $x_i$ satisfying $x_i < k$ is encoded as 0 and a label $x_i$ satisfying $x_i = k$ or $x_i > k$ is encoded as 1, for example. Regarding a method of encoding multiple values into binary values, reference may be made to the descriptions in S. Ramalingam et al., "Exact Inference in Multi-label CRFs with Higher Order Cliques", Proc. CVPR, pp. 1-8, 2008.

What is claimed is:

1. An image processing apparatus configured to assign a binary label representing belonging to a target region or belonging to another region to each pixel in an image, the image processing apparatus comprising:
   a memory configured to store processing instructions; and
   a processor configured to execute the stored processing instructions, which comprise:
   setting a plurality of shapes as a predicted shape of the target region;
   selecting a pixel group comprising N pixels in the image, where N is a natural number of 4 or more, which have positions representing the set predicted shape; and
   setting an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases;
   performing the labeling by minimizing the set energy function by using a discrete optimization process,
   selecting pixel groups respectively corresponding to the set plurality of different shapes, the pixel groups each comprising N pixels that have positions representing each of the set plurality of different shapes;
   determining N-th order terms corresponding to each of the selected pixel groups, in each of which a variable is a label of each pixel of the each of the selected pixel groups; and
   setting the energy function comprising a sum of the N-th order terms, so that a value of each of the N-th order term is at a minimum value when a combination of the labels assigned to pixels of the pixel group corresponding to the N-th order term is a pattern matching the set shape corresponding to the pixel group, and increases in stages from the minimum value along with an increase in the number of pixels to which a label different from the pattern is assigned,
   wherein the target region comprises a muscle region, and
   wherein the setting instruction of setting the predicted shape sets a plurality of relaxation curves each having a different degree of change in curvature as the plurality of different shapes.

2. An image processing apparatus configured to assign a binary label representing belonging to a target region or belonging to another region to each pixel in an image, the image processing apparatus comprising:
   a memory configured to store processing instructions; and
   a processor configured to execute the stored processing instructions, which comprise:
   setting a plurality of shapes as a predicted shape of the target region;
   selecting a pixel group comprising N pixels in the image, where N is a natural number of 4 or more, which have positions representing the set predicted shape; and
   setting an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases;
   performing the labeling by minimizing the set energy function by using a discrete optimization process,
   selecting pixel groups respectively corresponding to the set plurality of different shapes, the pixel groups each comprising N pixels that have positions representing each of the set plurality of different shapes;
   determining N-th order terms corresponding to each of the selected pixel groups, in each of which a variable is a label of each pixel of the each of the selected pixel groups; and
   setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value along with an increase in the number of pixel to which a label different from the pattern is assigned, wherein the target region comprises a vascular region, and wherein the setting instruction of setting the predicted shape sets a plurality of circles or spheres each having a different size and a different position, or each having any one of a different size or a different position as the plurality of different shapes.

3. An image processing apparatus configured to assign a binary label representing belonging to a target region or belonging to another region to each pixel in an image, the image processing apparatus comprising:

a memory configured to store processing instructions; and a processor configured to execute the stored processing instructions, which comprise:

setting a plurality of shapes as a predicted shape of the target region;

selecting a pixel group comprising N pixels in the image, where N is a natural number of 4 or more, which have positions representing the set predicted shape; and setting an energy function comprising an N-th order term in which a variable is a label of each of the N pixels of the selected pixel group, so that a value of the N-th order term is at a minimum value when a combination of the labels assigned to the N pixels of the selected pixel group is pattern matching the set predicted shape of the target region, and increases in stages from the minimum value as the number of pixels, to which a label different from the patter is assigned, increases;

performing the labeling by minimizing the set energy function by using a discrete optimization process, selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value along with an increase in the number of pixels to which a label different from the pattern is assigned, wherein the target region comprises an organ region, and wherein the setting instruction of setting the predicted shape sets a plurality of organ shapes each having a different principal component parameter obtained by principal component analysis as the plurality of different shapes.

4. An image processing method for assigning a binary label representing belonging to a target region or belonging to another region to each pixel in an image, the image processing method comprising:

a first step of setting, by a computer, a predicted shape of the target region;

a second step of selecting, by a computer, a pixel group comprising N pixels in the image, where N is a natural number of 4 or more, which have positions representing the set predicted shape of the target region, to set an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases; and a third step of performing, by the computer, the labeling by minimizing the set energy function by using a discrete optimization process, wherein the first step comprises setting a plurality of different shapes as the predicted shape of the target region, and wherein the second step comprises:

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases, wherein the target region comprises a muscle region, and wherein the first step comprises setting a plurality of relaxation curves each having a different degree of chance in curvature as the plurality of different shapes.

5. A computer-readable non-transitory recording medium having recorded thereon an image processing program for assigning a binary label representing belonging to a target region or belonging to another region to each pixel in an image, the image processing program causing a computer to execute:

setting a plurality of shapes as a predicted shape of the target region;

selecting a pixel group comprising N pixels in the image, where N is a natural number of 4 or more, which have positions representing the set predicted shape;

setting an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases;

performing the labeling by minimizing the set energy function by using a discrete optimization process;

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and

15 setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases, wherein the target region comprises a muscle region, and wherein the setting of the plurality of shapes as the predicted shape comprises setting a plurality of relation curves each having a different degree of change in curvature as the plurality of different shapes.

6. An image processing apparatus according to claim 1, wherein the discrete optimization process is a quadratic pseudo-Boolean optimization (QPBO) algorithm.

7. An image processing method for assigning a binary label representing belonging to a target region or belonging to another region to each pixel in an image, the image processing method comprising:

a first step of setting, by a computer, a predicted shape of the target region;

a second step of selecting, by a computer, a pixel group comprising N pixels in the image, where N is a natural number of 4 or more, which have positions representing the set predicted shape of the target region, to set an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases; and a third step of performing, by the computer, the labeling by minimizing the set energy function by using a discrete optimization process, wherein the first step comprises setting a plurality of different shapes as the predicted shape of the target region, and wherein the second step comprises:

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases, wherein the target region comprises a vascular region, and wherein the first step comprises setting a plurality of circles or spheres each having a different size and a different position, or each having any one of a different size or a different position as the plurality of different shapes.

16

8. A computer-readable non-transitory recording medium having recorded thereon an image processing program for assigning a binary label representing belonging to a target region or belonging to another region to each pixel in an image, the image processing program causing a computer to execute:

setting a plurality of shapes as a predicted shape of the target region;

selecting a pixel group comprising N pixels in the image, where N is a natural number of 4 or more, which have positions representing the set predicted shape;

setting an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases;

performing the labeling by minimizing the set energy function by using a discrete optimization process;

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases, wherein the target region comprises a vascular region, and wherein the setting of the plurality of shapes as the predicted shape comprises setting a plurality of circles or spheres each having a different size and a different position, or each having any one of a different size or a different position as the plurality of different shapes.

9. An image processing method for assigning a binary label representing belonging to a target region or belonging to another region to each pixel in an image, the image processing method comprising:

a first step of setting, by a computer, a predicted shape of the target region;

a second step of selecting, by a computer, a pixel group comprising N pixels in the image, where N is a natural number of 4 or more, which have positions representing the set predicted shape of the target region, to set an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases; and a third step of performing, by the computer, the labeling by minimizing the set energy function by using a discrete optimization process, wherein the first step comprises setting a plurality of different shapes as the predicted shape of the target region, and wherein the second step comprises:

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases wherein the target region comprises an organ region, and wherein the first step comprises setting a plurality of organ shapes each having a different principal component parameter obtained by principal component analysis as the plurality of different shapes.

10. A compute-readable non-transitory recording medium having recorded thereon an image processing program for assigning a binary label representing belonging to a target region or belonging to another region to each pixel in an image, the image processing program causing a computer to execute:

setting a plurality of shapes as a predicted shape of the target region;

selecting a pixel group comprising N pixels in the image, where N is a natural number of 4 or more, which have positions representing the set predicted shape;

setting an energy function comprising an N-th order term in which a variable is a label of each of the N pixels of the selected pixel group, so that a value of the N-th order term is at a minimum value when a combination of the labels assigned to the N pixels of the selected pixel group is a pattern matching the set predicted shape of the target region, and increases in stages from the minimum value as the number of pixels, to which a label different from the pattern is assigned, increases;

performing the labeling by minimizing the set energy function by using a discrete optimization process;

selecting pixel groups respectively corresponding to the set plurality of different shapes, the pixel groups each comprising N pixels that have positions representing each of the set plurality of different shapes;

determining N-th order terms corresponding to each of the selected pixel groups, in each of which a variable is a label of each pixel of the each of the selected pixel groups; and setting the energy function comprising a sum of the N-th order terms, so that a value of each of the N-th order terms is at a minimum value when a combination of the labels assigned to pixels of the pixel group corresponding to the N-th order term is a pattern matching the set shape corresponding to the pixel group, and increases in stages from the minimum value as the number of pixels, to which a label different from the pattern is assigned, increases wherein the target region comprises an organ region, and wherein the setting of the plurality of shapes as the predicted shape comprises setting a plurality of organ shapes each having a different principal component parameter obtained by principal component analysis as the plurality of different shapes.

* * * * *